(12) United States Patent
Jian (10) Patent No.: US 7,770,731 B2
(45) Date of Patent: Aug. 10, 2010

(54) APPARATUS USING AIR CYLINDERS AS CUSHIONING MEDIUM

(76) Inventor: Bo Xin Jian, 4F., No. 7, Lane 130, Mincyuan Rd., Sindian City, Taipei County (TW)

( * ) Notice: Subject to any disclaimer, the term of this patent is extended or adjusted under 35 U.S.C. 154(b) by 139 days.

(21) Appl. No.: 12/111,963

(22) Filed: Apr. 30, 2008

(65) Prior Publication Data
US 2008/0197041 A1 Aug. 21, 2008

Related U.S. Application Data

(63) Continuation-in-part of application No. 11/401,847, filed on Apr. 12, 2006, now abandoned.

(30) Foreign Application Priority Data
Sep. 6, 2005 (TW) ............................... 94209606 U (51) Int. Cl.
*B65D 81/02* (2006.01)
(52) U.S. Cl. .......................................... 206/522; 383/3
(58) Field of Classification Search ................. 206/522; 383/3
See application file for complete search history.

(56) References Cited

U.S. PATENT DOCUMENTS

| | | | | |
|---|---|---|---|---|
| 5,427,830 A | * | 6/1995 | Pharo | 206/522 |
| 5,454,642 A | * | 10/1995 | De Luca | 383/3 |
| 5,826,723 A | * | 10/1998 | Jaszai | 206/522 |
| 6,015,047 A | * | 1/2000 | Greenland | 206/522 |
| 6,629,777 B2 | * | 10/2003 | Tanaka et al. | 383/3 |
| 7,000,767 B2 | * | 2/2006 | Tanaka et al. | 206/522 |
| 7,066,331 B2 | * | 6/2006 | Koyanagi et al. | 206/522 |
| 7,128,211 B2 | * | 10/2006 | Nishi et al. | 206/522 |
| 7,311,204 B2 | * | 12/2007 | Nishi et al. | 206/522 |
| 2007/0131575 A1 | * | 6/2007 | Abe | 206/522 |
| 2007/0295633 A1 | * | 12/2007 | Liao et al. | 206/522 |

* cited by examiner

*Primary Examiner*—Bryon P Gehman
(74) *Attorney, Agent, or Firm*—Rabin & Berdo, P.C.

(57) ABSTRACT

In an apparatus using air cylinders as a cushioning medium, an air cylinder sheet constructed by a plurality of air cylinders is divided into a first zone and a second zone. The plurality of air cylinders of the second zone is formed with a bridge section between the two lines of bendable points. After the plurality of air cylinders of the first zone is bent along the plurality of bendable points and the plurality of air cylinders of the second zone are bent along the connecting line. This enables an article to be covered therein, and provides the article with a multi-facial cushioning. Parts of the plurality of air cylinders respectively at two ends of each of the plurality of bridge sections are bent along the plurality of bendable points to attach to each other so as to provide the article with double cushioning protection.

16 Claims, 7 Drawing Sheets

APPARATUS USING AIR CYLINDERS AS CUSHIONING MEDIUM

CROSS-REFERENCES TO RELATED APPLICATIONS

The present application is a continuation-in-part application of U.S. patent application Ser. No. 11/401,847 filed on Apr. 12, 2006, now abandoned which is hereby incorporated by reference.

FIELD OF THE INVENTION

The present invention relates to a cushioning apparatus, and more particularly to an apparatus using air cylinders as a cushioning medium.

BACKGROUND

Packing material is commonly encountered by the average consumer. Packing quality influences the aesthetic perception of merchandise, and therefore packing design is important to the product industry. Packing not only can enhance merchandise but also has an important objective, i.e. preventing a product from being damaged. Hence, cushioning materials have been subject to changes in fashion, and many varieties of conventional cushioning materials exist, such as clothing, paper, foam and Styron. Although they can serve the basic function of cushioning, they still cause environmental protection problems when detached from packing.

A recent packaging development has been low density polyethylene produced as a thin film, with a reverse check valve hot-pressed as an air cylinder the air cylinders manufactured as an air cylinder bag. This air-filled air cylinder bag is called an "air shockproof bag". For example, Taiwan Utility Model Patent No. M246317 entitled "Air Packing Bag" and Taiwan Utility Model Patent No. M256360 entitled "Manufacturing Apparatus for Air Packing Bag" both relate to the technology of an air filling bag and the facility thereof, and Chinese Patent No. ZL200420024028 entitled "air filling shockproof bag" discloses a packing bag formed by a plurality of air cylinders adjacent to but not connecting with each other. Such packaging is limited in use to protecting flat or rectangular articles, but left and right projecting corners will be formed on the profile of an irregular or square article such that space is unable to be saved and packaging volume will be increased. Furthermore, a cushioning wall or a multiple wall which has an internal partition is another flaw in standard air packing products.

SUMMARY OF THE INVENTION

The present invention is proposed as an improvement of an air packing bag structure to allow it to provide a packed article with multi-facial cushioning protection, simultaneously solving a problem that the profile of a conventional packing bag has left and right projecting corners occupying unnecessary space.

To obtain the result mentioned above, the present invention proposes an apparatus using air cylinders as a cushioning medium, comprising:

an air cylinder sheet, comprising a first zone and at least one second zone positioned at one side of the first zone, the first zone and the second zone being respectively constructed by a plurality of air cylinders;

at least one cutting line, positioned between the first zone and the second zone, a length of the cutting line being shorter than a length of the air cylinder, the plurality of air cylinders of the first zone is separated from the plurality of air cylinders of the second zone at the cutting line;

at least one connecting line, positioned between the first zone and the second zone and connect with the cutting line, the plurality of air cylinders of the first zone being connected to the plurality of air cylinders of the second zone at the connecting line;

a plurality of bendable points, positioned on the plurality of air cylinders, the plurality of air cylinders of the first zone being bent along the plurality of bendable points and the plurality of air cylinders of the second zone being bent along the connecting line thereby allowing an article to be packed; and a plurality of bridge sections, positioned between the two lines of bendable points of the plurality of air cylinders of the second zone, parts of the plurality of air cylinders at two ends of the plurality of bridge sections being bent along the plurality of bendable points to attach to each other to provide the article with double cushioning protection.

The present invention combines the air cylinder sheet with the bendable points, and the bendable points together with the air cylinder sheet are bent to use as an inner lining for an outer box; a variation of the inner lining of the outer box may be used, on one hand the article may be covered therein to provide the article with a multi-facial cushioning protection, i.e. front, rear, upper, lower, left and right faces of the article are guarded from a bump, on the other hand a double cushioning wall is formed by means of the design of a bridge structure, thereby strengthening the effect of protecting an article from impact.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1:
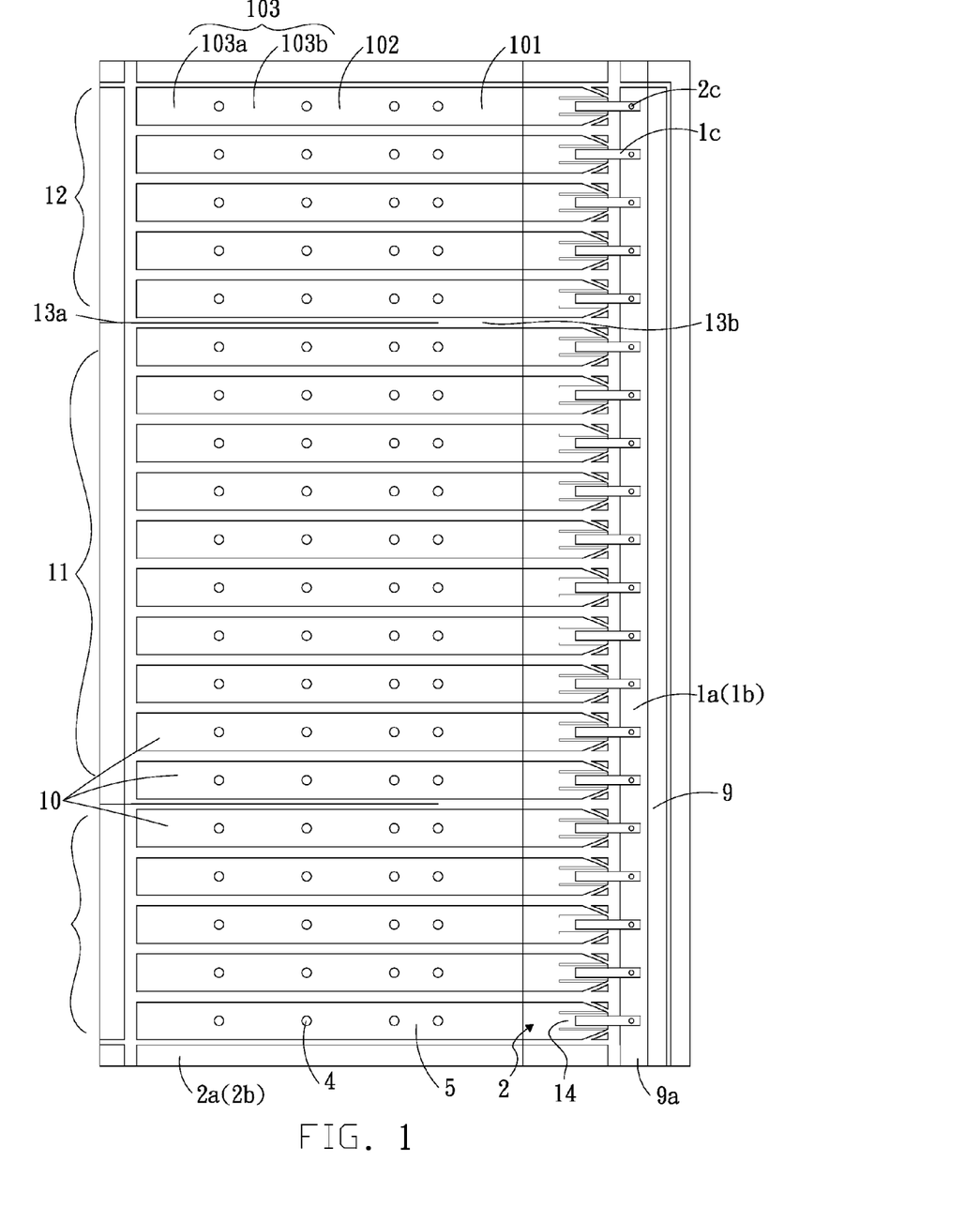
FIG. 1 is a plane view of an apparatus using air cylinders as a cushioning medium of the present invention.
Figure 2:
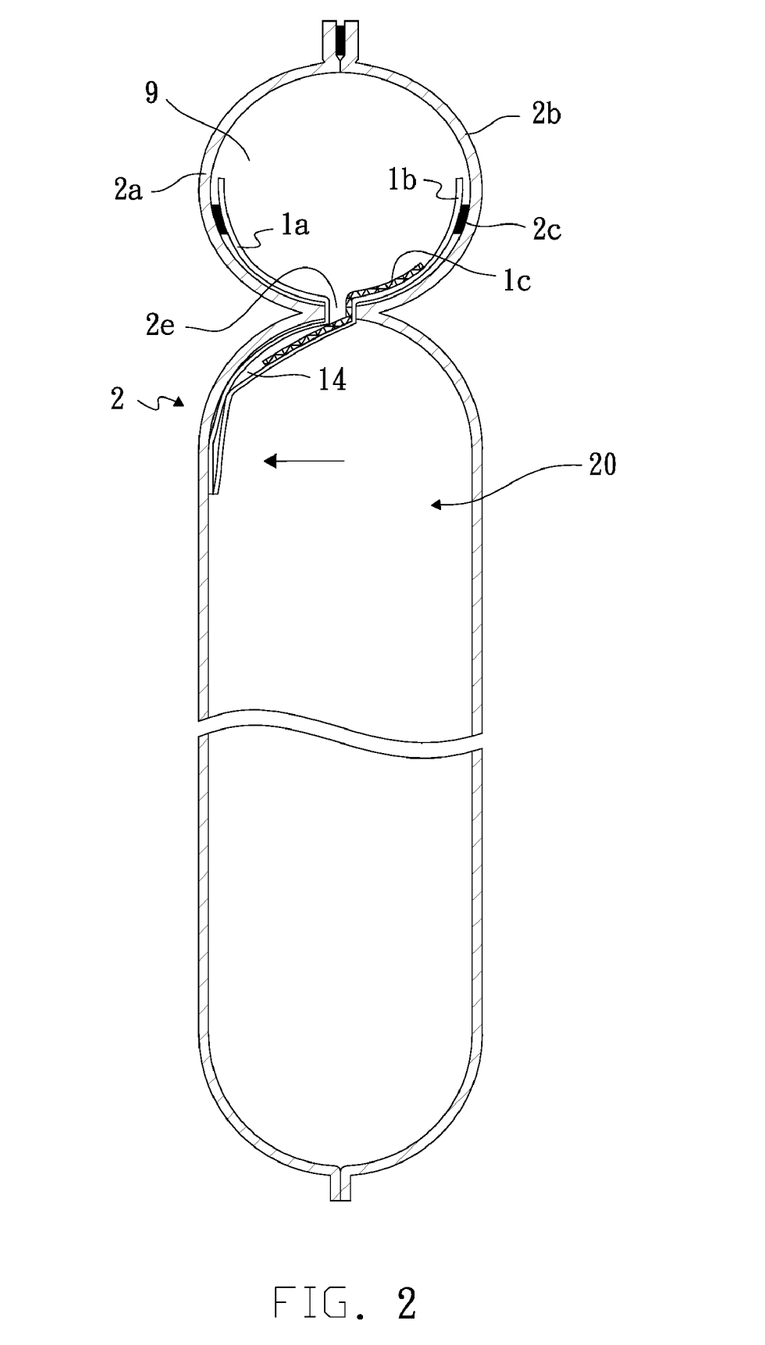
FIG. 2 is a cross sectional view of an apparatus using air cylinders as a cushioning medium of the present invention after being filled with air.

Please refer to FIGS. 1 and 2. An air cylinder sheet 1 is constructed by a plurality of air cylinders 10. Two sheets of inner film 1a and 1b are disposed between two sheets of outer film 2a and 2b to use as an air filling/check valve 2 after the two sheets of outer film 2a and 2b are stacked together vertically, in which a width of the two sheets of inner film 1a and 1b is the same as a width of the two sheets of outer film 2a and 2b, but a length thereof is shorter than a length of the two sheets of outer film 2a and 2b. Hot sealing is used subsequently to generate a hot sealing portion 2c so as to adhere the outer film 2a to the inner film 1a and the outer film 2b to the inner film 1b, in which the hot sealing portion 2c may be a dot type as shown in FIG. 1 or a straight line type but is not limited to these. Furthermore, the two sheets of outer film 2a and 2b are adhered to each other by means of hot sealing and in the meantime, the two sheets of inner film 1a and 1b are adhered to each other by means of hot sealing so as to form the air cylinders 10 between the two sheets of outer film 2a and 2b. Furthermore, one side of the plurality of air cylinders 10 is made with an air filling passageway 9 to allow the plurality of air cylinders 10 to be placed side by side at one side of the air filling passageway 9, in which the air filling passageway 9 is an air passable space formed by adhering the two sheets of outer film 2a and 2b by means of hot sealing, and one end of the air filling passageway 9 is formed with an air filling entrance 9a. Furthermore, the two sheets of inner film 1a and 1b are not adhered to each other even by means of hot sealing after a heat resistant material 1c is spread between the two sheets of inner film 1a and 1b to form a plurality of air inlets 2e used for connecting the air cylinders 10 with the air filling passageway 9 between the two sheets of inner film 1a and 1b. Besides, each air inlet 2e is connected with an air passageway 14, in which the air passageway 14 is formed between the two sheets of inner film 1a and 1b by adhering the two sheets of inner film 1a and 1b to each other by means of hot sealing after a heat resistant material 1c is spread between the two sheets of inner film 1a and 1b.

The two sheets of outer film 2a and 2b are pulled apart outward after air entering the air filling entrance 9a expands the air filling passageway 9, and the two sheets of inner film 1a and 1b are then forced to pull apart outward to open the air inlet 2e through the hot sealing portion 2c to allow the air to enter the air cylinder 10 via the air passageway 14 to cause the air cylinder 10 to be filled with air and expanded through the air filling/check valve 2. After the air cylinder 10 is filled with air and expanded, internal air pressure of the air cylinder 10 compresses the two sheets of inner film 1a and 1b to attach closely to the outer film 2a or 2b (the two sheets of inner film 1a and 1b may also be not side-attached onto the outer film 2a or 2b but hung in the air in the air cylinder 10 according to a structure difference) to cover the air passageway 14 to shield the air cylinder 10, creating an airtight seal preventing the air in the air cylinder 10 from leaking via the air filling/check valve 2.

Figure 3:
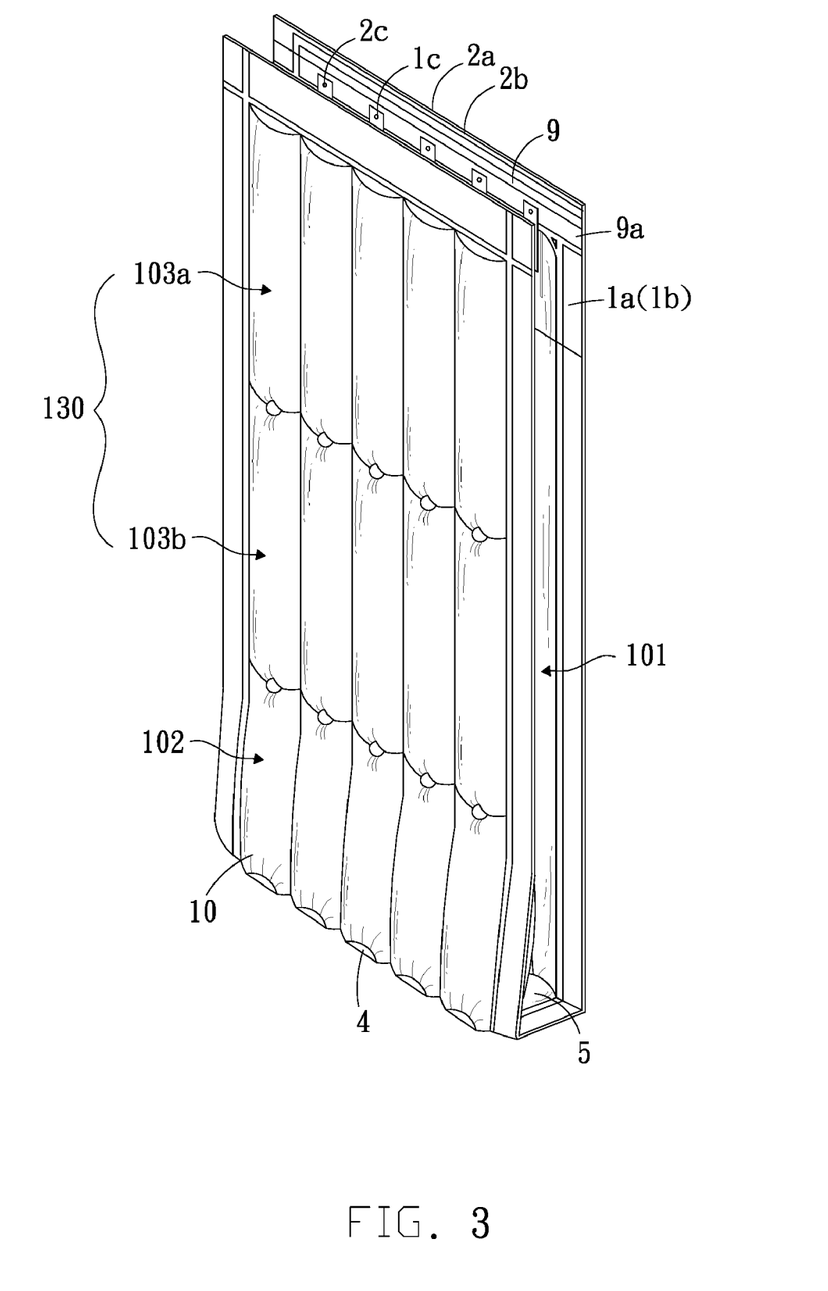
FIG. 3 is a schematic of a bridge structure of the present invention.
Figure 4:
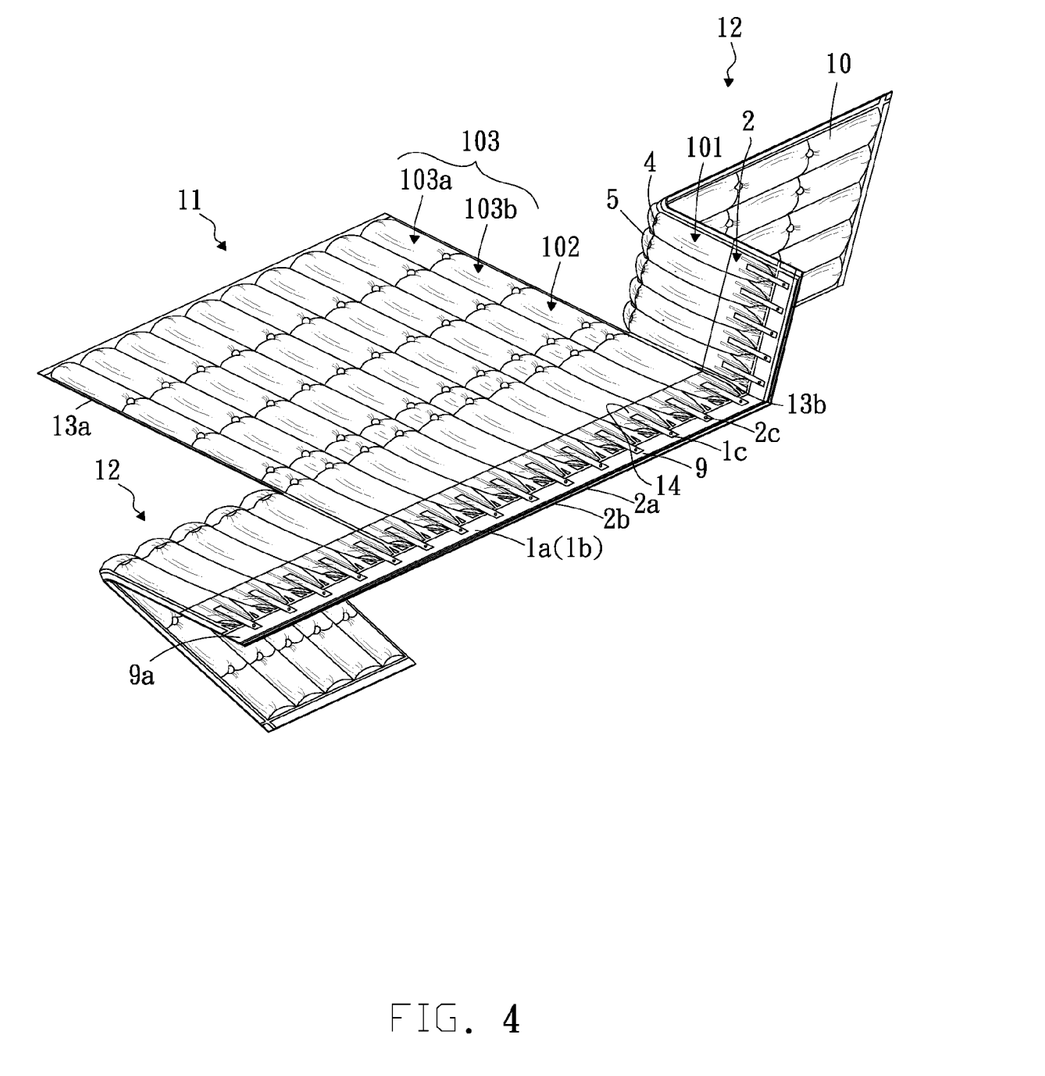
FIGS. 4, 5, 6 and 7 are schematic views, respectively showing an apparatus using air cylinders as a cushioning medium of the present invention while being bent.
Figure 5:
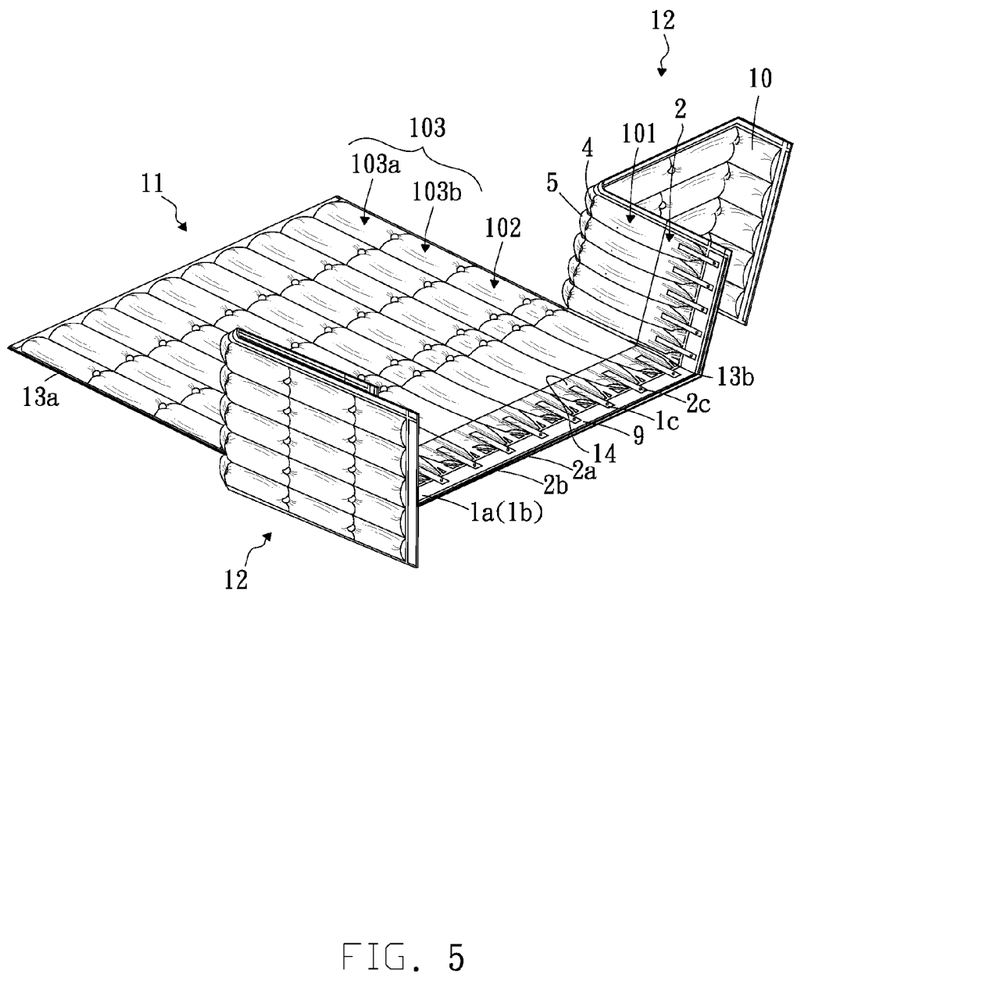
Figure 6:
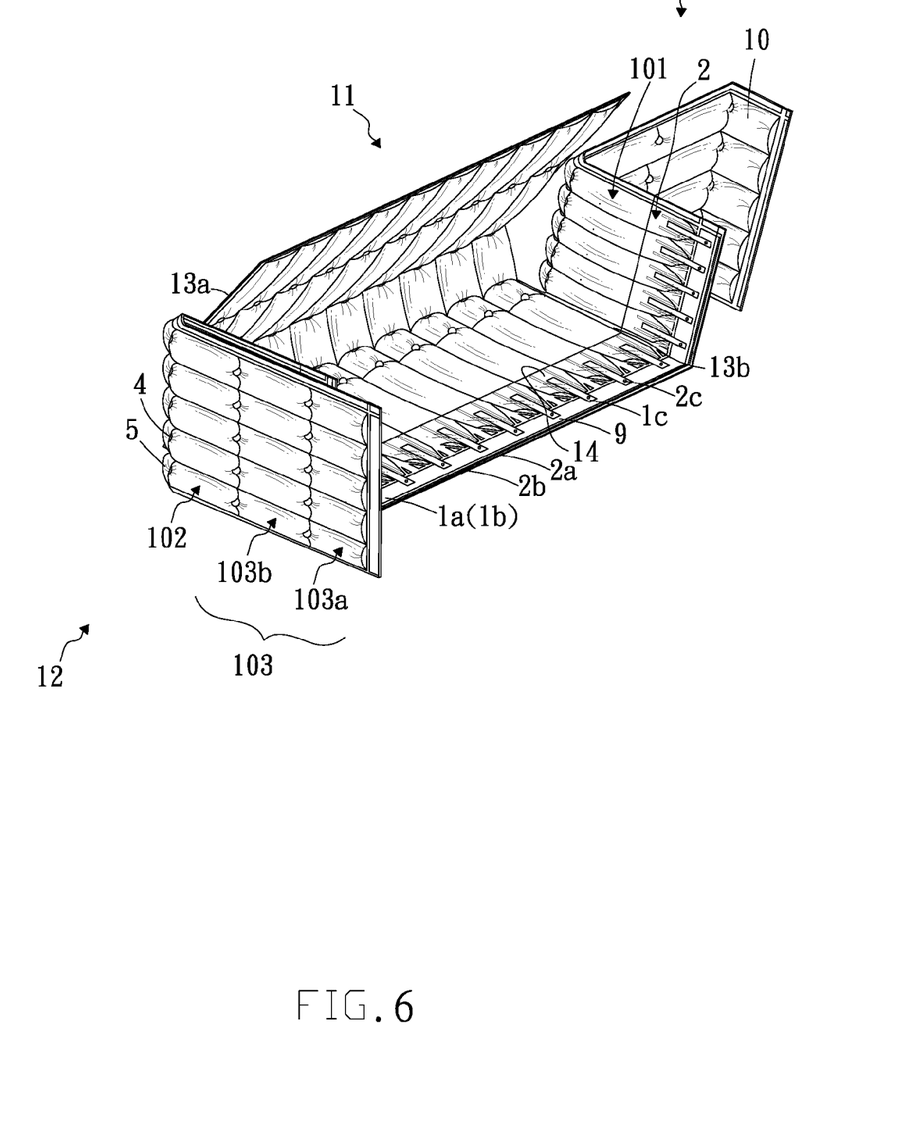
Figure 7:
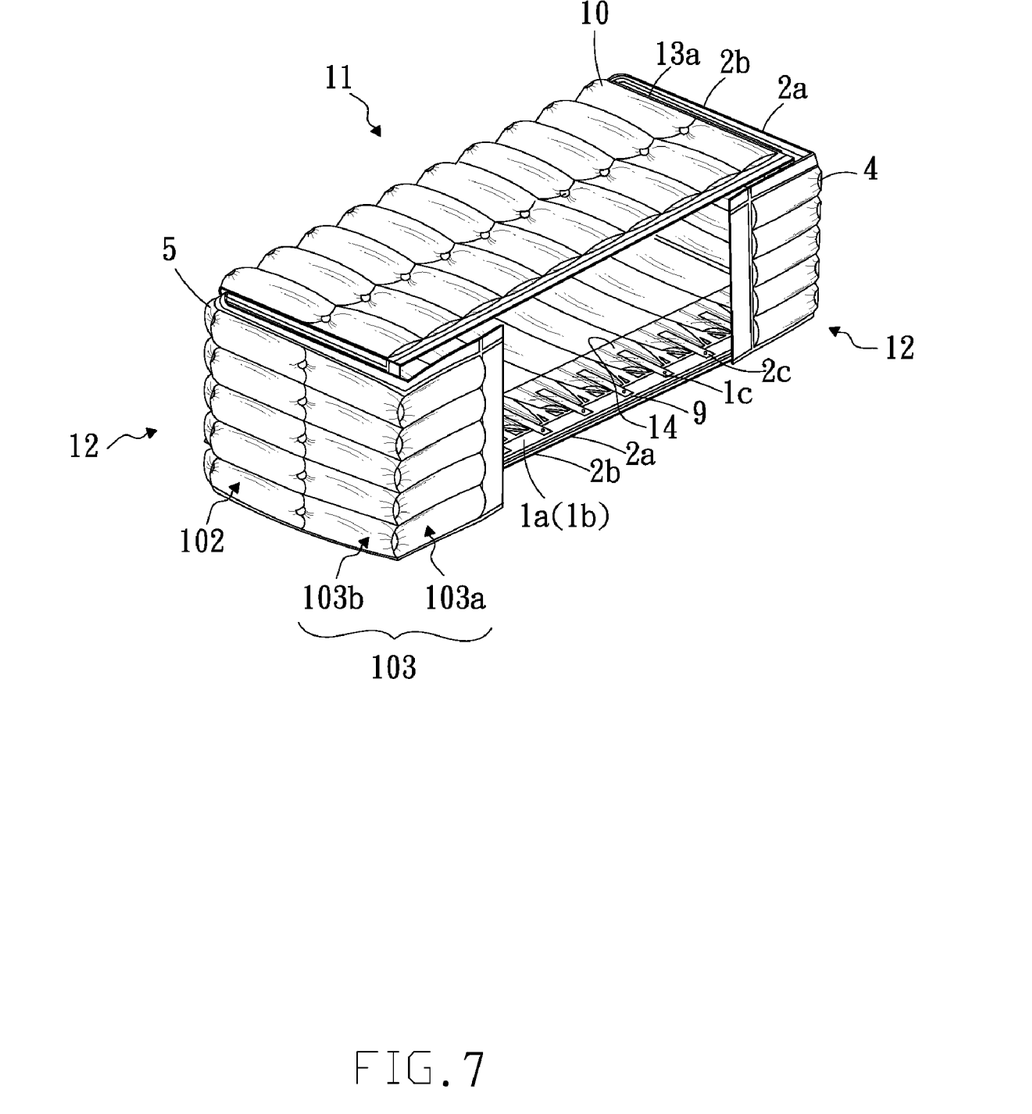

Please refer to FIGS. 1 and 3. The air cylinder 1 is divided into a first zone 11 and a second zone 12; the first zone 11 and the second zone 12 are respectively constructed by the plurality of air cylinders 10, and the second zone 12 is positioned at one side of the first zone 11, in which two sides of the first zone 11 may be positioned with the second zone 12 respectively if preferred, though the present invention is not limited to this configuration. Furthermore, the plurality of air cylinders 10 of the air cylinder sheet 1 comprises a first side section 101, a middle section 102 and a second side section 103, in which the middle section 102 is connected to the first side section 101, the second side section 103 is connected to the middle section 102, and the bendable points 4 may be respectively disposed between the first side section 101 and the middle section 102 and between the middle section 102 and the second side section 103, in which two lines of bendable points 4 spaced closer may (if preferred), be positioned between the first side section 101 and the middle section 102 to form a bridge section 5 between the two points 4 as FIG. 3 shows, and two parts of the air cylinder 1 at two ends of the bridge section 5 are bent along the two lines of bendable points 4 to attach to each other, in which the first side section 101 and the middle section 102 at the two ends of the bridge section 5 are substantially perpendicular to the bridge section 51 and attached to each other after being bent. Moreover, the bendable points 4 may be placed on the second side section 103 to allow the second side section 103 to be bent along the bendable points 4 to form an extension portion 103a and a side wall portion 103, in which a length of the middle section 102 plus a length of the side wall portion 103b may (if preferred), be the same as a length of the first side section 101, though the present invention is not limited to this configuration.

In addition, a cutting line 13a and a connecting line 13b may be positioned between the first zone and the second zone; in which the cutting line 13a is positioned at one side of the middle section 102 and the second side section, and the connecting line 13b is positioned at one side of the first side section 101. The lengths of the cutting line 13a and the connecting line 13b are all shorter than the length of the air cylinder 10, but the total length of both is approximately equal to the length of the air cylinder 10; the plurality of air cylinders 10 of the first zone 11 and the plurality of air cylinders 10 of the second zone 12 are separated from each other at the cutting line 13a and connected to each other at the connecting line 13b. Furthermore, the cutting line 13a may be made with perforations to form a straight line capable of being torn open, but it is not limited to this.

In the aforementioned description, the numbers and locations of the bendable points 4, the cutting line 13a and the connecting line 13b are only examples, and are not intended to limit the present invention.

Please refer to FIGS. 4, 5, 6 and 7. The plurality of air cylinders 10 of the first zone 11 and the plurality of air cylinders 10 of the second zone 12 are first separated from each other along the cutting line 13a, and the first side section 101 and the middle section 102 of the second zone 12 are bent along the two lines of bendable points 4 to attach to each other. Subsequently, the plurality of air cylinders 10 of the first zone 11 is bent along the plurality of bendable points to allow the first side section 101 and the second side section 103 of the first zone 11 to be substantially perpendicular to the middle section 102, forming a U-typed body provided with a level cushioning wall and two vertical cushioning walls. Articles may be placed in the internal protection space of the U-typed body. Next, the plurality of air cylinders 10 of the second zone is bent toward the plurality of air cylinders 10 of the first zone 11 along the connecting line 13b to allow the first side section 101 of the second zone 12 to be substantially perpendicular to the first side section 101, and the middle section 102 and the second side section 103 of the first zone 11 to form cushioning walls respectively positioned on both left and right sides of the internal protection space of the U-typed body such that the plurality of air cylinders 10 may be used for protecting the bottom face and four side faces of an article from impact.

Because the first side section 101 and the middle section 102 of the second zone 12 are bent along the two lines of bendable points 4 to attach to each other together, two double cushioning walls may respectively be formed on the both left and right sides of the internal protection space of the U-typed body such that the double cushioning walls of the left and the right sides can be used to provide a double cushioning protection effect.

In addition, a user may bend the extension portion 103a of the second zone 12 toward the internal protection space of the U-typed body along the bendable points 4 to cause the extension portion 103a to be substantially parallel to the middle section 102 of the first zone 11 so as to enable the extension portion 103a to cover the internal protection space of the U-typed body at the upper side thereof, and the plurality of air cylinders 10 may then be used to protect the top face, the bottom face and the four side faces of the article from impact.

A plurality of air cylinders may be bent into a square body or rectangular body for the containment of an article, depending on the difference in length required to solve the problem caused by the profile of a conventional packing bag having left and right projecting corners occupying unnecessary space. Accordingly, the present invention using air cylinders as a cushioning medium can be placed into an outer box easily after an article has been packed inside. In addition, the air cylinder cushioning apparatus of the present invention is a simple plane sheet structure during manufacture, and can be bent along bendable points and a connecting line after being filled with air to enable the plurality of air cylinders to guard six faces of the article from a bump and allows the air cylinders to form a double cushioning wall strengthening the cushioning protection effect by means of a design of a bridge section structure.

Additional advantages and modifications will readily occur to those proficient in the relevant fields. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus using air cylinders as a cushioning medium, comprising:
   an air cylinder sheet, comprising a first zone and at least one second zone positioned at one side of the first zone, the first zone and the second zone being respectively constructed by a plurality of air cylinders;
   at least one cut line, positioned between the first zone and the second zone, where the length of the at least one cut line is shorter than the length of one of the air cylinders, the air cylinders of the first zone and the air cylinders of the second zone being separated from each other at the at least one cut line;
   at least one connecting line, positioned between the first zone and the at least one second zone and connected with the at least one cut line, the air cylinders of the first zone and the air cylinders of the at least one second zone being connected with each other at the at least one connecting line;
   a plurality of bendable points, positioned in the air cylinders, a width of each of the bendable points being smaller than a width of one of the air cylinders, the air cylinders of the first zone being bent along the bendable points and the air cylinders of the at least one second zone being bent along the at least one connecting line thereby allowing an article to be covered; and
   a plurality of bridge sections, positioned between two of the bendable points of the air cylinders of the at least one second zone, parts of the air cylinders at two ends of each bridge section being bent along the bendable points to attach to each other so as to be disposed substantially perpendicular to the bridge section, thereby providing the article with double cushioning protection.

2. The air cylinder cushioning apparatus according to claim 1, wherein the air cylinder sheet further comprises:
   two outer films, stacked together vertically;
   two inner films, placed in between the outer films, where the width of the inner films is the same as the width of the outer films;
   an air filling passageway, being a space formed by adhering the outer films by means of hot sealing;
   a plurality of air inlets, positioned between the air filling passageway and the air cylinders, and formed by not adhering the inner films even by means of hot sealing, after a heat resistant material is applied between the inner films; and
   at least one hot sealing portion, used for adhering one sheet of the outer film and one sheet of the inner film, the inner films being forced by the at least one hot sealing portion to pull apart outward, automatically opening the air inlets when air in the air filling passageway causes the outer films to be expanded.

3. The air cylinder cushioning apparatus according to claim 2, wherein the air cylinders are each air storable spaces formed by adhering the two outer films to each other by means of hot sealing.

4. The air cylinder cushioning apparatus according to claim 3, wherein the at least one cut line may be cut adjacent to at least one of the plurality of air cylinders, and in a region adhered by the hot sealing.

5. The air cylinder cushioning apparatus according to claim 1, wherein the air cylinders each comprise a first side section positioned in the first zone and in the at least one second zone, a middle section positioned in the first zone and in the at least one second zone, and connected to the first side section, and a second side section positioned in the first zone and in the at least one second zone, and connected to the middle section.

6. The air cylinder cushioning apparatus according to claim 5, wherein the bendable points are positioned between the first side section and the middle section, between the middle section and the second side section or a combination thereof.

7. The air cylinder cushioning apparatus according to claim 6, wherein the first side section and the second side section positioned in the first zone are substantially perpendicular to the middle section.

8. The air cylinder cushioning apparatus according to claim 7, wherein the first side section positioned in the at least one second zone is substantially perpendicular to the first side section, the second side section and the middle section positioned in the first zone.

9. The air cylinder cushioning apparatus according to claim 8, wherein the middle section positioned in the at least one second zone is bent along the bendable points to attach to the first side section positioned in the at least one second zone.

10. The air cylinder cushioning apparatus according to claim 5, wherein the bendable points are positioned on the second side section and used to allow the second side section to be bent to form an extension portion and a side wall portion.

11. The air cylinder cushioning apparatus according to claim 10, wherein the extension portion of the at least one second zone is substantially parallel to the middle section of the first zone.

12. The air cylinder cushioning apparatus according to claim 10, wherein the length of the middle section plus the length of the side wall portion is equal to the length of the first side section.

13. The air cylinder cushioning apparatus according to claim 5, wherein the at least one cut line is positioned at one side of the middle section and the second side section.

14. The air cylinder cushioning apparatus according to claim 5, wherein the at least one connecting line is positioned at one side of the first side section.

15. The air cylinder cushioning apparatus according to claim 5, wherein the bridge sections are positioned between the first side section and the middle section.

16. The air cylinder cushioning apparatus according to claim 1, wherein parts of the air cylinders at two ends of each of the bridge sections are respectively bent to be substantially perpendicular to the bridge sections along the bendable points.

* * * * *